UNITED STATES PATENT OFFICE.

MANUEL J. FERREIRA, OF NEW BEDFORD, MASSACHUSETTS.

COMPOSITION FOR TREATMENT OF LEATHER ROLLER SURFACES.

1,403,944.  Specification of Letters Patent.  Patented Jan. 17, 1922.

No Drawing.   Application filed March 29, 1921. Serial No. 456,562.

*To all whom it may concern:*

Be it known that I, MANUEL J. FERREIRA, a subject of Portugal, residing at New Bedford, in the county of Bristol and State of Massachusetts, have invented a new and useful Composition for Treatment of Leather Roller Surfaces, of which the following is a specification.

The object of my invention is the production of a liquid composition, analogous to a varnish, to be applied to the surfaces of leather faced comber rollers in cotton cloth manufacturing machinery, for the purpose of preserving the leather surfaces, and having the qualities of quick drying, long durability, together with a frictional quality which prevents the accumulation of cotton on the rollers, an accumulation that causes a substantial breakage of comber needles.

My composition consists of a mixture of brown fish glue, an aqueous solution of acetic acid, lamp black, denatured alcohol, benzin, and oil of mirbane (nitrobenzene.)

In preparing the composition I prefer to use the ingredients in about the following proportions, using liquid measure: two and one half quarts brown fish glue (ground); one quart lamp black; six quarts 28% aqueous solution acetic acid; two and one half pints denatured alcohol; one and one half gills benzin; and one half gill oil of mirbane (nitrobenzene). I mix the ground fish glue with the acetic acid by boiling the two until they are thoroughly mixed; after the mixture cools off, I pour in the denatured alcohol, benzin, and nitrobenzene, stirring thoroughly; and then pour in the lamp black, stirring the whole mass until it is well mixed.

My composition possesses as a whole in a high degree all the desired properties in a liquid for treatment of leather faced comber rollers, namely: a good preservative, long life, quick drying, and an ideal frictional quality.

I claim:

A liquid composition consisting of ground brown fish glue, an aqueous solution of acetic acid, lamp black, denatured alcohol, benzin, and nitrobenzene (oil of mirbane).

Signed at New Bedford, in the county of Bristol and State of Massachusetts, this twenty-second day of March, A. D. 1920.

MANUEL J. $\underset{\text{mark}}{\overset{\text{His}}{+}}$ FERREIRA.

Witness to mark:
  VINCENT J. GRACE.